United States Patent
Lemoine et al.

(10) Patent No.: US 7,534,924 B2
(45) Date of Patent: May 19, 2009

(54) HYDROCARBON MIXTURES COMPRISING MODIFIED POLYCYCLIC AROMATIC HYDROCARBONS

(75) Inventors: Guy Lemoine, Le Havre (FR); Boulos Youssef, Saint-Aignan (FR); Claude Bunel, Bihorel (FR); Yannick Jolivet, Le Havre (FR); Jean-Marie Pinoche, Gainneville (FR)

(73) Assignee: Total Fina Elf France, Puteaux (FR)

( * ) Notice: Subject to any disclaimer, the term of this patent is extended or adjusted under 35 U.S.C. 154(b) by 522 days.

(21) Appl. No.: 10/510,770

(22) PCT Filed: Apr. 2, 2003

(86) PCT No.: PCT/FR03/01026

§ 371 (c)(1), (2), (4) Date: Oct. 12, 2004

(87) PCT Pub. No.: WO03/085014

PCT Pub. Date: Oct. 16, 2003

(65) Prior Publication Data

US 2005/0256350 A1    Nov. 17, 2005

(30) Foreign Application Priority Data

Apr. 9, 2002 (FR) .................................. 02 04393

(51) Int. Cl.
- *C07C 7/20* (2006.01)
- *C07C 13/00* (2006.01)
- *C10L 1/06* (2006.01)
- *C10L 1/16* (2006.01)
- *C10L 5/00* (2006.01)
- *C10M 105/02* (2006.01)
- *C10M 109/00* (2006.01)
- *C10M 111/00* (2006.01)
- *C10M 115/02* (2006.01)
- *C10M 119/00* (2006.01)
- *C10M 121/00* (2006.01)
- *C10M 127/00* (2006.01)
- *C10M 159/00* (2006.01)

(52) U.S. Cl. .................. 585/1; 585/7; 585/17; 585/502

(58) Field of Classification Search ................ 585/446, 585/457, 1, 7, 17, 502
See application file for complete search history.

(56) References Cited

U.S. PATENT DOCUMENTS

| | | | | |
|---|---|---|---|---|
| 4,864,033 A | * | 9/1989 | Bradshaw et al. | 548/446 |
| 6,024,865 A | * | 2/2000 | Alexander et al. | 208/218 |
| 6,100,373 A | * | 8/2000 | Sheares | 528/422 |
| 2002/0052535 A1 | * | 5/2002 | Matsumoto et al. | 585/457 |

FOREIGN PATENT DOCUMENTS

DE    43 32 806 A1    3/1995

OTHER PUBLICATIONS

International Search Report (ISR) completed Aug. 26, 2003.

* cited by examiner

*Primary Examiner*—Walter D Griffin
*Assistant Examiner*—Frank C Campanell
(74) *Attorney, Agent, or Firm*—Sughrue Mion, PLLC

(57) ABSTRACT

A hydrocarbon mixture containing modified polycyclic aromatic compounds or modified PAC having a chemical structure of mean molecular weight ranging between 300 and 10,000, the chemical structure being represented by formula (I): $(A)_x(PAC)_y$, wherein x and y are integers corresponding to the numbers of A or PAC units, selected such that x/y is equal to at least 1, preferably ranging between 1 and 50 and wherein A is a unit corresponding to a polymerizable monomer containing between 2 and 60 carbon atoms.

18 Claims, No Drawings

HYDROCARBON MIXTURES COMPRISING MODIFIED POLYCYCLIC AROMATIC HYDROCARBONS

BACKGROUND OF THE INVENTION

The present invention relates to hydrocarbon mixtures obtained from petroleum cuts comprising modified polycyclic aromatic hydrocarbons or modified PACs. It also relates to methods for producing these hydrocarbon mixtures and to uses of these hydrocarbon mixtures.

The presence of aromatic compounds in hydrocarbons obtained from petroleum cuts or from their refining is a major problem for the refiner. Some aromatic compounds are necessary for the good quality of the commercial product, but others, such as polycyclic aromatic compounds or PACs, are toxic to the environment and to humans in particular. Indeed, the toxicological standards have classified some of these PAC aromatic compounds among the products exhibiting a possible carcinogenic danger.

The expression PAC is understood to mean, in the remainder of the present description, all the polycyclic aromatic compounds, including those comprising in their chemical structure heteroatoms such as sulfur, nitrogen and oxygen. Among these PACs are pure condensed PAHs or polycyclic aromatic hydrocarbons, some of which appear in the lists of products recognized as being carcinogenic and/or mutagenic products.

Accordingly, some petroleum cuts containing some of these PAHs have been classified Carcinogenic Cat2 (substances which are carcinogenic in animals).

One of the main worries of refiners is therefore to limit, or even eliminate, these PAC compounds from products sold on the market, regardless of their subsequent use.

Numerous processes have been studied for reducing the PAC content of these petroleum cuts in order to reduce their carcinogenic power.

Among these processes, many are designed to extract or convert the dibenzothiophene derivatives, the carbazole derivatives and the condensed polycyclic aromatic hydrocarbons (PAHs). The routes explored are catalytic hydrogenation, oxydesulfuration or the extraction of these compounds by formation of charge transfer complexes.

While all these processes are of interest to the refiner, the processes used are not 100% efficient on all hydrocarbon cuts and often result in a loss of materials because the undesirable products are extracted before being treated.

In the field of the treatment of bituminous sand, tar and charcoal residues, industrialists have chosen to add, to separate cuts and extracts, polymers of the group consisting of PVC, butadiene-styrene, anthracene and polystyrene oil and optionally ferric chloride, and then to heat the mixtures thus obtained so as to substantially reduce their benzopyrene content (see DE 4138561, and the publications by Janusz Zielinsky in Polymery-Tworzywa wielkoczasteczlowe, 1995, 40 (10), 591 and J. Am. Chem. Soc., Div. Fuel Chem. (1995), 40 (4), 768-770).

In patent JP 05271117, there is described the purification of aromatic naphthalene cuts extracted from coal tar containing sulfur-containing polycyclic aromatic hydrocarbons, in particular dibenzothiophenes. In this purification process, a first step consists in polymerizing, on these sulfur-containing polycyclic compounds, an olefin in the presence of an acid catalyst, clay, alumina or zeolite, preferably zeolite Y, at a temperature of between 50 and 250° C. In a second step, the polymers thus formed are then extracted by distillation, a purified aromatic cut thus being obtained.

None of the processes proposed envisages the treatment of a PAC mixture in a mixture of completely or partially aromatic hydrocarbons.

Moreover, in the polymerization field, it is known to use polycyclic aromatic hydrocarbons or PACs, taken individually, as polymerization retardants. Thus, it is possible to use individually, as retardant, naphthalene, anthracene, phenanthrene or benzopyrenes. This retardant effect essentially depends on their actual reactivity in a polymerization reaction.

BRIEF SUMMARY OF THE INVENTION

In the context of the present invention, the applicant aims to modify, as a priority, the PACs which are present in a mixture with other aromatic compounds in petroleum cuts and therefore to use a selective process aimed at blocking the most reactive chemical sites on the PAC molecules, while allowing the PACs thus modified to preserve their aromatic character. These well-known sites are chemically the most reactive sites (J. L. Ihrig and S. Pal Sood in Journal of polymer science, Part A, Vol. 3, 1573-1586 1965). Of course, this selective process can modify the chemical structure of the non-PAC aromatic hydrocarbons initially present, without this being an aim sought by the invention.

The first subject of the present invention is therefore a hydrocarbon mixture comprising modified polycyclic aromatic compounds or modified PACs, characterized in that these modified PACs have a chemical structure with an average molar mass of between 150 and 10 000, this chemical structure being represented by formula (I) below:

$$(A)_x(PAC)_y \qquad \text{(I)}$$

in which x and y are integers corresponding to the number of A and PAC units, respectively, chosen such that x/y is greater than or equal to 1, preferably between 1 and 50, and in which the A unit represents a polymerizable monomer or a mixture of monomers, comprising from 2 to 60 carbon atoms.

The expression initial PACs is understood to mean in the remainder of the present description the PACs initially present in the hydrocarbon mixtures before the addition of one or more A monomers. The expression modified PACs is understood to mean the compounds of formula (I).

In the remainder of the present description, the A unit will be described with reference to the nature of the monomer which generated it and will be called A monomer.

DETAILED DESCRIPTION OF THE INVENTION

In a preferred embodiment of the invention, the modified PACs have an average molar mass of between 150 and 5000, and the x/y ratio is between 1 and 20.

The A units, in formula (I) according to the present invention, preferably correspond to A monomers with a chemical structure corresponding to formula (II) below:

(II)

in which $R_1$, $R_2$, $R_3$ and $R_4$ are identical or different and are chosen from the group consisting of hydrogen, linear or branched alkyl groups comprising from 1 to 10 carbon atoms, which are unsubstituted or substituted with halogen atoms, aromatic or nonaromatic rings and/or alkyloxycarbonyl acetate, acrylate and alkyl acrylate groups, or chosen such that at least two groups $R_1$ and $R_3$, or $R_2$ and $R_4$, are linked to form a ring containing 5 or 6 carbon atoms.

In a preferred embodiment of the invention, the A monomer is an olefin chosen from alkenes and dienes comprising from 2 to 10 carbon atoms, preferably from butadiene, isoprene, propene and isobutene.

In a second preferred embodiment, the A monomer is chosen from alkenyl halides, preferably vinyl chloride, alkenyl acetates, preferably vinyl acetate, acrylic derivatives, preferably alkyl acrylates and methacrylates, in particular methyl acrylate and methacrylate, styrene and its derivatives, and heterocycles comprising at least one oxygen, nitrogen or sulfur heteroatom, preferably tetrahydrofuran, epoxides and cyclosiloxanes.

In parallel, the PAC units in formula (I) correspond to polycyclic aromatic compounds of the group consisting of pyrene, phenanthrene, anthracene, benzopyrenes, benzoanthracenes, chrysene, benzoperylene, fluoranthene, benzofluoranthenes, naphthalene, acenaphthene, fluorene, acenaphthylene and derivatives of the dibenzothiophene and carbazole families.

The mixtures according to the invention also comprise hydrocarbons of the group consisting of linear or branched, saturated or unsaturated paraffin, naphthene and/or aromatic hydrocarbons, optionally containing sulfur, nitrogen or oxygen heteroatoms.

A second subject of the invention is a process for preparing hydrocarbon mixtures containing modified PACs, characterized in that it comprises at least a first step which consists in adding to the hydrocarbon mixture containing unmodified PACs at least 1% of A monomer, and optionally at least 0.1% by weight of an ionic and/or free-radical polymerization initiator.

In the process according to the invention, the A monomer is chosen such that the initial PACs of the mixture have a transfer constant preferably greater than 1 in relation to the A monomer. As the concentration of initial PACs is generally low, the A monomer is preferably chosen from those whose transfer constant in relation to these PACs is the highest possible, so as to limit as much as possible the quantities of A monomer added.

Furthermore, regardless of the polymerization reaction used, the choice of the initiators depends on the nature of the A monomer used.

In a first embodiment of this process, when the polymerization reaction is a free-radical polymerization reaction, the A monomer is chosen from monomers of the group consisting of alkenyl halides, preferably vinyl chloride, alkenyl acetates, preferably vinyl acetate, alkyl acrylates and methacrylates, preferably methyl methacrylate, and styrene and its derivatives, and the initiator is chosen from the group consisting of azo and peroxide initiators, preferably azobisisobutyronitrile, and benzoyl peroxide.

In a second embodiment of the process according to the invention, when the polymerization reaction is an ionic, preferably cationic, polymerization reaction, the A monomer is chosen from monomers of the group consisting of alkenes, dienes, preferably butadiene, isoprene, propene and isobutene, styrene and its derivatives, and heterocycles comprising at least one oxygen, nitrogen or sulfur heteroatom, preferably tetrahydrofuran, epoxides and cyclosiloxanes, and the ionic initiator is preferably chosen from cationic initiators.

In this embodiment, the cationic initiator is preferably chosen from the group consisting of Lewis acids of the group comprising aluminum, titanium, tin and boron halides, and Brönsted acids, preferably perchloric acid, sulfuric acid and triflic acid.

Most advantageously, these polymerization reactions in the hydrocarbon mixture are carried out at a temperature at which there is no degradation of the modified PACs. Thus, not only can the reaction take place at atmospheric pressure, at room temperature or higher, but also at low temperatures, for example at less than 0° C. for hydrocarbons with a very low yield point. Preferably, the temperature range for the reaction will comprise those which promote the reactions for the transfer of active centers, radicals or ions to the PACs present in the mixture. There will be no departure from the framework of the invention if the procedure is carried out at high temperature or under pressure for some very viscous products.

In a preferred embodiment of the invention, 1 to 100% by weight of A monomer is added to the hydrocarbon mixture containing the initial PACs, and from 0.1 to 5% by weight of a polymerization initiator. Quite obviously, without departing from the framework of the invention, it would be possible to increase the quantities of A monomer which have reacted with the PACs in order to modify the physicochemical properties of the hydrocarbon mixture.

When, after the first stage of the process, the hydrocarbon mixture separates into two immiscible phases, the process according to the invention advantageously comprises at least a second step of separation by decantation, filtration, centrifugation or distillation. There would be no departure from the framework of the present invention if the separation operation is repeated.

A third subject of the invention is the use of the mixture containing modified PACs according to the invention completely or partially as component of plasticizers, bituminous products, catalytic cracking products, atmospheric residues, residues under vacuum, lubricating bases and combustibles, fuels or fuel oils.

Indeed, unlike the teachings of the prior art, the hydrocarbons containing the modified PACs according to the invention can be used as they are. In some cases, these modified PACs improve the physicochemical properties of a product, promote the increase in their viscosity and the reduction in their content of initial PAC.

In the remainder of the present description, examples are given to illustrate the invention without however wishing to limit the scope thereof.

EXAMPLE I

The present example describes a free-radical polymerization process according to the invention, applied to an aromatic extract of a distillate under vacuum (hereinafter "extract") consisting of a 350° C. to 550° C. petroleum cut containing 100 ppm of PAC.

To modify these PACs, the procedure is carried out on the laboratory scale in a 100 ml two-necked round-bottomed flask provided with a condenser and an inlet for an inert gas (nitrogen), equipped with a stirrer and placed in an oil bath thermostated at 80° C., for 6 hours. Several mixtures were tested and are referenced in Table I as samples $X_1$ to $X_7$. After reaction, the excess monomer was evaporated under vacuum.

TABLE I

| Sample | M(extract) (g) | M(VA) (g) | AIBN/VA (*) | Mass (VA) polymerized (g) |
|---|---|---|---|---|
| $X_1$ | 10 | 10 | $10^{-2}$ | 1.47 |
| $X_2$ | 10 | 10 | $4 \times 10^{-2}$ | 3.92 |
| $X_3$ | 10 | 10 | $5 \times 10^{-2}$ | 4.35 |
| $X_4$ | 10 | 10 | $6 \times 10^{-2}$ | 5.45 |
| $X_5$ | 5 | 10 | $6 \times 10^{-2}$ | 6.57 |
| $X_6$ | 15 | 10 | $6 \times 10^{-2}$ | 2.93 |
| $X_7$ | 20 | 10 | $6 \times 10^{-2}$ | 1.61 |

AIBN = azobisisobutyronitrile marketed by the company ALDRICH
VA = vinyl acetate marketed by the company ALDRICH
(*) ratio of concentrations Each sample thus prepared was analyzed by GC-MS (coupling gas chromatography-mass spectrometry) in order to measure the content of PAHs (content in the PACs) of the samples $X_1$ to $X_7$ after free-radical polymerization.

The results of these analyses in relation to the nature of the PAHs still present are given in Table II below.

TABLE II

| PAH | Toxicity | $X_1$ | $X_2$ | $X_3$ | $X_4$ | $X_5$ | $X_6$ | $X_7$ |
|---|---|---|---|---|---|---|---|---|
| Benzo(a)pyrene | +++ | 60.6 | 67 | 71 | 72 | 69 | 66.4 | 57.4 |
| Benzo(b)fluoranthene | ++ | 27.1 | 56 | 70.3 | 70.0 | 90.6 | 68 | 12.4 |
| Benzo(a)anthracene | + | 15.5 | — | 3.8 | 0.6 | 13.5 | 16.9 | 6.8 |
| Chrysene | + | 21.6 | 9.5 | 20.2 | 12.3 | 42.3 | 24.6 | 11.1 |
| Benzo(g,h,i)perylene | +/− | 4 | 45.1 | 67.5 | 58.2 | 90.1 | 53.7 | 31.2 |
| Benzo(e)pyrene | +/− | — | 18.6 | 34.3 | 24 | 56.3 | 26.9 | 12.9 |

The toxicity of the samples is in agreement with the dossier No. 92/101 entitled "Aromatic Extracts", page 7, by Concawe (The Oil Companies European Organization for Environmental and Health Protection).

It is observed that the most toxic PAH compounds are removed at more than 50% within 6 hours and even at more than 70% for the samples $X_3$ to $X_5$. With reference to the least toxic (+/−) samples, the reactivity during polymerization is much lower.

In general, the percentage of PAHs removed increases when the vinyl acetate concentration increases (from $X_1$ to $X_5$) and when the AIBN concentration increases (from $X_7$ to $X_5$).

In the reaction medium formed by the aromatic extract, the initiation of polymerization of vinyl acetate and the decrease in the percentage of PAH are more effective in the presence of AIBN (see Table III below for benzoyl peroxide).

TABLE III

| PAH | Toxicity | % |
|---|---|---|
| Benzo(a)pyrene | +++ | 9 |
| Benzo(b)fluoranthene | ++ | 26 |
| Benzo(a)anthracene | + | 54 |
| Chrysene | + | 19 |
| Benzo(g,h,i)perylene | +/− | 25 |
| Benzo(e)pyrene | +/− | 1 |

EXAMPLE II

The present example is designed to compare the efficacy of the free-radical polymerization initiators. Two polymerization initiators were tested for modifying the initial PAHs of the aromatic extract of Example I in the presence of vinyl acetate.

For benzoyl acetate $(C_6H_5CO)_2O_2$, the polymerization procedure is carried out at 91° C. for 6 hours, with a (dibenzoyl peroxide)/(VA) ratio of 0.06.

For tert-butyl peroxybenzoate $(C_6H_5CO_2OC(CH_3)_3)$, the polymerization is carried out at 110° C. for 6 hours, with an initiator/VA ratio of 0.06.

The quantities of aromatic extract and of VA are 10 g each. The quantity of VA which has reacted with the initial PAHs corresponds to 0.13 g and 0.25 g respectively for benzoyl peroxide and tert-butyl peroxybenzoate.

In conclusion, compared with these yields, those obtained in Example I in the presence of AIBN as polymerization initiator are higher. In the reaction medium formed by the aromatic extract, the initiation of polymerization of vinyl acetate by AIBN is more efficient.

EXAMPLE III

Five samples Yi were prepared using styrene as monomer, as a replacement for VA of Example 1, under the same conditions of temperature and duration as in this Example I.

The mass ratios and the results of the analyses by GC-MS for the sample Y1 are given in Tables IV and V below.

TABLE IV

| Sample | M(extract) (g) | M(styrene) (g) | (AIBN)/ (styrene) | M (polymerized styrene) (g) |
|---|---|---|---|---|
| Y1 | 10 | 5 | $5 \times 10^{-2}$ | 3.14 |
| Y2 | 10 | 10 | $5 \times 10^{-2}$ | 9.79 |
| Y3 | 30 | 10 | $5 \times 10^{-2}$ | 9.42 |
| Y4 | 30 | 5 | 0.12 | 4.56 |
| Y5 | 20 | 1 | 0.6 | 0.59 |

TABLE V

| PAH | Toxicity | Y1 |
|---|---|---|
| Benzo(a)pyrene | +++ | nd |
| Benzo(b)fluoranthene | ++ | 23 |
| Benzo(a)anthracene | + | 43 |
| Chrysene | + | 23 |
| Benzo(g,h,i)perylene | +/− | 21 |
| Benzo(e)pyrene | +/− | 3 |

The mass of polymerized styrene is practically quantitative. However, the reduction in the percentage of PAH is lower compared with vinyl acetate. The homo-polymerization is favored compared with the transfer to the PAHs.

EXAMPLE IV

The present example describes the use of another monomer, butyl vinyl ether (BVE), as a replacement for VA under the conditions of temperature and duration of Example I. The quantities of aromatic extract are 10 g per 5 g of BVE in the presence of AIBN such as $(AIBN)/(BVE)=5\times 10^{-2}$. The quantity of polymerized BVE is 0.05 g. The results of the analyses are given in Table VI.

TABLE VI

| PAH | Toxicity | % |
|---|---|---|
| Benzo(a)pyrene | +++ | 83 |
| Benzo(b)fluoranthene | ++ | 25 |
| Benzo(a)anthracene | + | 61 |
| Chrysene | + | 40 |
| Benzo(g,h,i)perylene | +/− | 49 |
| Benzo(e)pyrene | +/− | 96 |

The polymerized mass is very low, but the transfer to the PAHs is high. The reduction in the percentage of PAH is comparable with that for VA.

EXAMPLE V

The present example describes a cationic polymerization process according to the invention applied to an aromatic extract of a distillate under vacuum of Example I containing 100 ppm of PAH.

To modify these PAHs, the procedure is carried out on the laboratory scale in a three-necked round-bottomed flask equipped with a condenser and an inlet for inert gas. There are introduced into the round-bottomed flask B g of aromatic extract, C g of monomer (styrene) and D ml of a solution containing the initiator. In this example, this solution consists of 6.67 g of aluminum chloride in 50 ml of nitrobenzene.

Four trials were carried out, varying the concentrations of the various reagents. These trials are referenced $Z_1$-$Z_4$ in Table VII below.

TABLE VII

|  | Z1 | Z2 | Z3 | Z4 |
|---|---|---|---|---|
| B (g) | 10 | 10 | 10 | 10 |
| C (g) | 0 | 2.7 | 4.5 | 9.1 |
| D (ml) | 1 | 1 | 1 | 1 |
| M (*) (g) | 0 | 0.8 | 0.9 | 7.6 |

(*) M = mass of styrene which has reacted

The polystyrene yield only becomes high when the quantity of monomer is equivalent to that for the aromatic extract. The analyses show that the best results are obtained for Z3 and that it is essentially benzo(e)pyrene which is eliminated (Table VIII).

TABLE VIII

| PAH | Toxicity | Z1 | Z2 | Z3 | Z4 |
|---|---|---|---|---|---|
| Benzo(a)pyrene | +++ | 13 | 0 | 24 | 7 |
| Benzo(b)fluoranthene | ++ | 19 | 0 | 46 | 8 |
| Benzo(a)anthracene | + | 50 | 65 | 44 | 0 |
| Chrysene | + | 6 | 0 | 2 | 28 |

TABLE VIII-continued

| PAH | Toxicity | Z1 | Z2 | Z3 | Z4 |
|---|---|---|---|---|---|
| Benzo(g,h,i)perylene | +/− | 16 | 8 | 18 | 0 |
| Benzo(e)pyrene | +/− | 87 | 85 | 92 | 86 |

EXAMPLE VI

The present example relates to the polymerization of vinyl acetate with the PACs contained in domestic fuel oil or FOD. The procedure is carried out under the conditions of Example I, using AIBN as polymerization initiator.

The results are given in Table IX below.

TABLE IX

| Sample | M (FOD) (g) | M (VA) (g) | M (AIBN) (g) | (AIBN)/(VA) | M (polymerized VA) (g) |
|---|---|---|---|---|---|
| E1 | 10 | 10 | 0.12 | $5 \times 10^{-3}$ | 0.93 |
| E2 | 10 | 10 | 0.76 | $4 \times 10^{-2}$ | 7.16 |
| E3 | 10 | 10 | 1.14 | $6 \times 10^{-2}$ | 6.78 |
| E4 | 30 | 10 | 0.96 | $5 \times 10^{-2}$ | 3.11 |

For each trial, two clearly distinct phases were obtained: a liquid phase with the same appearance as FOD and a gel phase.

The phases are separated by decantation and the rate of disappearance of PAC from the first liquid of similar appearance to FOD is observed.

The results are given in Table X below and relate to the two most toxic PAHs encountered in FOD.

TABLE X

| PAH | Toxicity | E1 | E2 | E3 | E4 |
|---|---|---|---|---|---|
| Benzo(a)anthracene | + | 68 | 100 | 100 | 100 |
| Chrysene | + | 27 | 54 | 67 | 61 |

In the case of FOD, a complete disappearance of the benzo (a)anthracene and up to about 70% of the chrysene (experiment E3) is observed.

The invention claimed is:

1. A hydrocarbon mixture obtained from petroleum cuts, which is a complex hydrocarbon mixture comprising polycyclic aromatic compounds (PACs), and other aromatic compounds, in which at least some of the PACs are modified, characterized in that these modified PACs have a chemical structure with an average molar mass of between 150 and 10,000, this chemical structure being represented by formula (I) below:

$$(A)_x(PAC)_y \qquad (I)$$

in which x and y are integers corresponding to the number of A and PAC units, respectively, chosen such that x/y is greater than or equal to 1, wherein the A unit represents a polymerizable monomer or a mixture of monomers, comprising from 2 to 60 carbon atoms, characterized in that the A unit comprises an A monomer of formula (II) below:

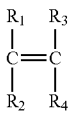

in which $R_1$, $R_2$, $R_3$ and $R_4$ are identical or different and are chosen from the group consisting of hydrogen, linear or branched alkyl groups comprising from 1 to 10 carbon atoms, which are unsubstituted or substituted with halogen atoms, aromatic or nonaromatic rings and/or alkyloxycarbonyl acetate, acrylate and alkyl acrylate groups, or chosen such that at least two groups $R_1$ and $R_3$, or $R_2$ and $R_4$, are linked to form a ring containing 5 or 6 carbon atoms, and characterized in that the A monomer comprises a compound chosen from alkenyl halides, alkenyl acetates, acrylic derivatives, styrene and its derivatives, and heterocycles comprising at least one oxygen, nitrogen or sulfur heteroatom.

2. The mixture as claimed in claim 1, characterized in that the modified PACs have an average molar mass of between 150 and 5,000, and x/y is from 1 to 20.

3. The mixture as claimed in claim 1, characterized in that the A monomer comprises an olefin chosen from alkenes and dienes comprising from 2 to 10 carbon atoms.

4. The mixture as claimed in claim 1, characterized in that the PAC units correspond to those of the aromatic hydrocarbons selected from the group consisting of pyrene, phenanthrene, anthracene, benzopyrenes, benzoanthracenes, chrysene, benzoperylene, fluoranthene, benzofluoranthenes, naphthalene, acenaphthene, fluorene, acenaphthylene and derivatives of the dibenzothiophene and carbazole families.

5. The mixture as claimed in claim 1, characterized in that it further comprises linear or branched, saturated or unsaturated paraffin, naphthene and/or aromatic hydrocarbons, optionally containing sulfur, nitrogen or oxygen heteroatoms.

6. A process for preparing a hydrocarbon mixture obtained from petroleum cuts, which is a complex hydrocarbon mixture comprising polycyclic aromatic compounds, (PACs), and other aromatic compounds, in which at least some of the PACs are modified, characterized in that these modified PACs have a chemical structure with an average molar mass of between 150 and 10,000, this chemical structure being represented by formula (I) below:

$$(A)_x(PAC)_y \qquad (I)$$

in which x and y are integers corresponding to the number of A and PAC units, respectively, chosen such that x/y is greater than or equal to 1, and wherein the A unit represents a polymerizable monomer or a mixture of monomers, comprising from 2 to 60 carbon atoms, characterized in that it comprises at least a first step which comprises adding to the hydrocarbon mixture containing unmodified PACs at least 1% of A monomer, and at least 0.1% by weight of an ionic and/or free-radical polymerization initiator.

7. The process as claimed in claim 6, characterized in that, when the polymerization reaction is a free-radical polymerization reaction, the A monomer comprises a monomer selected from the group consisting of alkenyl halides, alkenyl acetates, alkyl acrylates and methacrylates, and styrene and its derivatives, and the initiator is selected from the group consisting of azo and peroxide initiators.

8. The process as claimed in claim 6, characterized in that, when the polymerization reaction is an ionic polymerization reaction, the A monomer comprises a monomer selected from the group consisting of alkenes, dienes, isoprene, propene and isobutene, styrene and its derivatives, and heterocycles comprising at least one oxygen, nitrogen or sulfur heteroatom, and the initiator is ionic.

9. The process as claimed in claim 8, characterized in that the initiator is a cationic initiator selected from the group consisting of Lewis acids and Brönsted acids.

10. The process as claimed in claim 6, characterized in that the polymerization reaction is carried out at a temperature less than the temperature for degradation of the modified PACs.

11. The process as claimed in claim 6, characterized in that 1 to 100% by weight of A monomer is added to the hydrocarbon mixture containing the initial PACs, and from 0.1 to 5% by weight of a polymerization initiator.

12. The process as claimed in claim 6, characterized in that it further comprises a second step of separation by decantation, centrifugation or distillation, when, at the end of the first step, the mixture obtained has two distinct phases.

13. A composition for plasticizers, bituminous products, catalytic cracking products, atmospheric residues, residues under vacuum, lubricating bases and combustibles, fuels or fuel oils, comprising the hydrocarbon mixture as claimed in claim 1.

14. The mixture as claimed in claim 1, in which x and y are integers corresponding to the number of A and PAC units, respectively, chosen such that x/y is from 1 and 50.

15. The mixture as claimed in claim 1, characterized in that the A monomer comprises a compound selected from the group consisting of vinyl chloride, vinyl acetate, an alkyl acrylate or methacrylate, styrene, tetrahydrofuran, an epoxide and a cyclosiloxane.

16. The process as claimed in claim 7, characterized in that, when the polymerization reaction is a free-radical polymerization reaction, the A monomer comprises a monomer selected from the group consisting of vinyl chloride, vinyl acetate, and methyl methacrylate, and the initiator is selected from the group consisting of azobisisobutyronitrile and benzoyl peroxide.

17. The process as claimed in claim 8, characterized in that the polymerization reaction is a cationic polymerization reaction, the A monomer comprises a monomer selected from the group consisting of butadiene, tetrahydrofuran, an epoxide and a cyclosiloxane, and the initiator is cationic.

18. The process as claimed in claim 9, characterized in that the cationic initiator is either a Lewis acid selected from the group consisting of aluminum, titanium, tin and boron halides or a Brönsted acid selected from the group consisting of perchloric acid, sulfuric acid and triflic acid.

* * * * *